US011108974B2

(12) United States Patent
Behrenberg et al.

(10) Patent No.: US 11,108,974 B2
(45) Date of Patent: Aug. 31, 2021

(54) SUPPLEMENTING VIDEO MATERIAL (71) Applicant: IDEMIA Identity & Security Germany AG, Bochum (DE)

(72) Inventors: Christian Behrenberg, Essen (DE); Christian Dubray, Herne (DE); Christian Winter, Rheda-Wiedenbrück (DE)

(73) Assignee: IDEMIA Identity & Security German AG, Bochm (DE)

(*) Notice: Subject to any disclaimer, the term of this patent is extended or adjusted under 35 U.S.C. 154(b) by 154 days.

(21) Appl. No.: 16/516,207

(22) Filed: Jul. 18, 2019

(65) Prior Publication Data
US 2020/0029027 A1 Jan. 23, 2020

(30) Foreign Application Priority Data

Jul. 17, 2018 (EP) .................................... 18183859

(51) Int. Cl.
G08B 13/196 (2006.01)
H04N 5/268 (2006.01)
G06F 3/0484 (2013.01)
G06K 9/00 (2006.01)
H04N 5/272 (2006.01)

(52) U.S. Cl.
CPC ......... H04N 5/268 (2013.01); G06F 3/04842 (2013.01); G06K 9/00288 (2013.01); G06K 9/00744 (2013.01); G06K 9/00771 (2013.01); H04N 5/272 (2013.01); G06K 2009/00738 (2013.01); G06K 2209/27 (2013.01)

(58) Field of Classification Search
CPC .... H04N 5/268; H04N 5/272; G06K 9/00288; G06K 9/00744; G06K 9/00771
See application file for complete search history.

(56) References Cited

U.S. PATENT DOCUMENTS

| 8,917,308 | B2* | 12/2014 | Kaltsukis ......... G08B 13/19695 348/14.02 |
| 10,409,858 | B2* | 9/2019 | Duggal ............... G06F 16/2455 |
| 2005/0169367 | A1* | 8/2005 | Venetianer ....... G08B 13/19673 375/240.01 |
| 2009/0087161 | A1 | 4/2009 | Roberts et al. |
| 2012/0243730 | A1* | 9/2012 | Outtagarts ......... G06K 9/00771 382/103 |
| 2013/0176438 | A1* | 7/2013 | Mate ..................... H04N 7/181 348/157 |

(Continued)

OTHER PUBLICATIONS

Extended European Search Report issued by the European Patent Office for European Patent Application No. 18183859.0 dated Jan. 24, 2019.

Primary Examiner — Jeremiah C Hallenbeck-Huber
(74) Attorney, Agent, or Firm — Moore & Van Allen PLLC; Henry B. Ward, III (57) ABSTRACT The present disclosure relates to a computer-implemented method for supplementing video material, the method comprising: controlling a display device to display a first video, associated with a first camera and retrieved from a storage device; analyzing the first video to automatically detect at least one camera, in particular located in an area of interest; and controlling the display device to display a second video associated with a second camera among the detected at least one camera in response to a user input.

19 Claims, 4 Drawing Sheets (56) References Cited

U.S. PATENT DOCUMENTS

| | | | |
|---|---|---|---|
| 2014/0126881 A1* | 5/2014 | Yoneda | H04N 21/2665 386/241 |
| 2014/0161354 A1* | 6/2014 | Curcio | G06K 9/00718 382/190 |
| 2015/0036875 A1 | 2/2015 | Savransky | |
| 2015/0077548 A1* | 3/2015 | Meredith | H04N 7/183 348/143 |
| 2015/0143492 A1* | 5/2015 | Berry | H04L 65/403 726/7 |
| 2017/0180961 A1* | 6/2017 | Gauglitz | G06Q 30/06 |
| 2018/0041733 A1 | 2/2018 | Saptharishi | |
| 2019/0197396 A1* | 6/2019 | Rajkumar | G06N 3/08 |

* cited by examiner

SUPPLEMENTING VIDEO MATERIAL

FIELD OF THE INVENTION

The invention relates to supplementing video material, in particular video material that has been gathered using a surveillance system, with additional video material. Particularly, the invention aims to facilitate the work of law enforcement and intelligence agencies when analyzing video material to investigate crimes.

BACKGROUND OF THE INVENTION

Video analysis has become a major forensic resource that has changed the way crimes and cases are investigated. With the continued development of small-scale cameras, in particular implemented in mobile phones, new image sources are continuously introduced these days. In addition to approximately 200 million cameras deployed worldwide in public places, video material coming from smart phones and social media is playing a more and more prominent role in law enforcement and crime investigation.

Recently, several metropolitan police forces have introduced platforms where citizens may upload privately recorded videos to report crimes such as hate crimes, robbery and hit-and-run accidents. In some cases, the police or associated software developers provide user-friendly apps that allow citizens to upload their videos to the police servers conveniently and at no extra cost. In addition, investigators have started to put out public calls for video material from private sources related to terrorist attacks or other crimes affecting public safety.

Overall, the amount of available video material that has to be processed by analysts and investigators has been rapidly increasing over the past years with a predicted similar trend for the future. As such, algorithms and tools that alleviate the work of the investigators have become more and more relevant. One example is the Video and Image Analytic Platform of the applicant that helps analysts and investigators to streamline and speed up the process of reviewing available video material.

While automatic object and personal identification in videos using computer-assisted video processing, such as face recognition processing, has become more and more commonplace and efficient in the past years, these automatic processing tools are generally applied to individual videos independently and sequentially. It therefore remains a challenging task for the analyst to establish a relationship between individual videos that may have come from largely inhomogeneous sources. Tracing a suspect's movement in the vicinity of a crime scene or establishing a connection between objects such as vehicles, suitcases, or the like and an identified person is therefore still largely carried out in a manual procedure.

Consequently, there is a need to further facilitate the work of investigators by an automatic procedure for establishing a relationship between relevant videos out of a large number of available videos, in particular with respect to a detected crime. Furthermore, it is desirable to automatically detect potential other video sources in existing videos to allow for a more targeted request to individual citizens.

DESCRIPTION OF THE INVENTION

The invention provides a computer-implemented method for supplementing video material, the method comprising:

controlling a display device to display a first video, associated with a first camera and retrieved from a storage device;

analyzing the first video to automatically detect at least one camera, in particular located in an area of interest; and controlling the display device to display a second video associated with a second camera among the detected at least one camera in response to a user input.

Unless explicitly indicated otherwise, technical terms used in the present disclosure are used with their usual meaning in the technical field of video processing. By way of example, a video refers to a plurality of successive video frames, each video frame including image data. In addition, the video may comprise audio data. In the present disclosure, the term video in particular refers to real-world videos i.e. such a videos that are captured using video capturing equipment, i.e. a camera, as opposed to artificially generated videos. The videos according to the present disclosure may, however, be submitted to post-processing that may enhance, modify and/or add particular video data. Also, the generically used term video of the present disclosure relates to videos that may comprise additional data, in particular metadata, in addition to the actual video data, namely the video frames. The additional data may be provided as part of a single file or as separate data, as will be described in detail below. If not explicitly mentioned otherwise, the term video here and in the following refers to a recorded video. Each recorded video according to the present disclosure is considered to be associated with a camera that captured the corresponding video.

As already indicated above, the present disclosure is not specifically limited to a particular type of video capturing device but may include any kind of camera suitable for capturing and storing and/or transmitting captured video content. Particular examples are fixedly installed or moving surveillance cameras, cell phone cameras, and portable cameras with video capturing functionality. Further examples are dash cameras and other cameras installed in vehicles as well as helmet cameras or body cameras. The present disclosure is applicable to any kind of technical embodiment of such cameras, and in particular independent of technical specifications such as resolution, frame rate, or color map or the like. The video capturing device may further be adapted to capture corresponding sound and record it together with the video frames. The captured video may be stored locally on a storage device and/or memory of the corresponding camera, stored on a separate storage device, in particular as part of a Software as a Service (SaaS) provider, such as The Cloud, stored in a database, stored on a server, in particular a police server, and/or any storage device known in the art.

Necessary connectivity, e.g. Internet connections, LAN, WiFi, or the like may be provided as needed to establish the required data connections for implementing the present disclosure. By way of example, some or all of the videos may be retrieved from a remote storage location, such as a centralized police data server, via the Internet or dedicated data connections and may be processed on local computing facilities of a police station or an investigator.

According to the present disclosure, initially a display device is controlled to display a first video that is associated with a first camera and retrieved from a storage device. The display device may be any display device known in the art, fixedly installed or mobile, such as a liquid crystal display, an (O)LED, a video projector, a touchscreen, or the like. The display device may be provided as part of the computing facility, in particular a computer including further components such as input devices, storage devices, processors or the like. The display device may in particular be provided as part of a system that allows analysts and investigators to review video material. It may thus be part of an installed surveillance system.

The individual steps of the above mentioned method do not necessarily have to be executed in a consecutive order. In particular, some of the steps may be executed in an inverted order and/or at least partly in parallel. By way of example, analyzing the first video to automatically detect at least one camera located in an area of interest may be performed beforehand, e.g. by processing the first video before displaying it. Alternatively or additionally, the first video may be analyzed in real time during display of the video. Also, processing of the first video may be performed as part of batch processing of the contents of a database storing a large number of videos.

According to the present disclosure, the analysis of the first video to automatically detect at least one camera is performed by a computer, in particular by a processor, such as a CPU or GPU. The analysis may be performed automatically or upon request by a user. As will be described in more detail below, detecting at least one camera, in particular located in an area of interest, may include processing not only the first video, but one or more additional videos, in particular the content of an entire video database. The area of interest may be preset, e.g. by a user, and may in particular depend on the particular case. By way of example, the area of interest may comprise a city square that has been identified as the scene of a crime. In some cases, the area of interest may, however, comprise entire neighborhoods or even an entire city, in particular if a suspect's movement shall be traced. Also, the area of interest may be defined based on a maximum distance from the location of the first camera that captured the first video.

The area of interest may also be defined based on a context that may be set or selected by the user. By way of example, presence of a particular person, e.g. a suspect, or a particular item, e.g. a suitcase, in a video may establish a context. Furthermore, a context may be defined to include one or more conditions, e.g. a person in a recorded video is running or a train is entering/leaving a train station. Such a context of a video may be established using well-known automatic pattern and/or face recognition techniques. Pattern and face recognition processing of a video may in particular be performed using neural networks that can be initially or continuously trained.

Finally, according to some embodiments the area of interest may be defined as the space that is visible in the first video. Map information, in particular stored in a database or available from the Internet, may be used to preset and/or automatically determine the area of interest.

The present invention aims at an automatic identification of available additional video material that has been captured by cameras located in an area of interest at a particular time period and/or is related to the first video through a particular context. Both the area of interest and the time period are therefore directly related to the first video which itself may be selected by an investigator as a starting point for the investigation. By way of example, an investigator aware of a criminal act at a particular time in the past at a particular location may select a recorded surveillance video captured by a suitable camera as the first video to start the investigation. In addition, the investigator may select a context such as a particular person or item, for instance among persons and/or items automatically detected in the first video or from a list of contexts that may be pre-defined and/or generated by the computer from the first video and/or other videos. The present disclosure provides an automatic detection of at least one camera that potentially or actually recorded additional video material that may be of relevance for the investigation of the criminal act. To facilitate the work of the investigator, the present invention automatically analyzes the first video and optionally additional videos to detect such a camera.

The investigator, i.e. user, may then provide a user input to display a second video associated with a second camera among the detected at least one camera. The user may in particular select a camera among the detected at least one camera and prompt the display device to display an associated video.

The computer-implemented method according to the present disclosure therefore allows an investigator to quickly and conveniently change his or her perspective with respect to the investigated crime scene, for instance by switching from displaying the first video to displaying the second video display as a result of a user input. As indicated above, any suitable input device, such as a pointing device, a touchscreen, a mouse, a keyboard, or the like may be used for the user input.

By analyzing the first video to automatically detect at least one camera, in particular located in an area of interest, and associating at least one video with the at least one camera, wherein the at least one video may be retrieved from the same or a different storage device, the Internet, the Cloud, or an alternative storage location, the described method supplements video material, e.g. an initially selected surveillance video, with additional video material. This allows an investigator to better analyze the crime scene, in particular as the additional video material provides a different angle and/or view than the surveillance video.

According to an embodiment, controlling the display device to display the second video may comprise receiving, as the user input, a selection input for selecting the second camera, in particular in a displayed video frame of the first video, wherein the selection input is input by the user by means of an input device; identifying a video frame of the second video corresponding to the displayed video frame of the first video; and controlling the display device to display the second video starting from the identified video frame.

Any of the input devices mentioned above may be used by the user, e.g. an investigator, to select the second camera. If the second camera is visible in a displayed video frame of the first video the selection may be performed by selecting the second camera in the displayed video frame, for instance by clicking on the second camera. As part of the automatic detection of the at least one camera, an image object representing the second camera in the first video may be identified as described in more detail below. Based on the identified image object, the method according to the present embodiment may determine a region in the displayed video frame that, when selected by the user input, corresponds to a selection of the second camera. As also described in more detail below, the user selection of the second camera may be performed in a separate area, for instance a picture-in-picture, representing a spatial relation of the at least one detected camera with respect to the first camera. The user may pause display of the first video via a corresponding user input to better select the second camera.

Once the second camera has been selected through the user input, the system, i.e. computer, automatically identifies a video frame of the second video corresponding to the displayed video frame of the first video in which the user input occurred. This may be done based on timestamps of the first and second videos and/or based on one or more of the above-mentioned contexts. If timestamps, in particular a time of day, are included in the first and second videos, particularly as metadata, a video frame of the second video at approximately the same time as the displayed video frame of the first video may be identified. If no exact match of the timestamps is possible, the next video frame of the second video following the timestamp of the displayed video frame of the first video may be identified.

If at least one of the first and second videos does not include the above-mentioned timestamps, the video frame of the second video may also be identified based on a context. By way of example, the first occurrence of a person identified in the first video in the second video may be used to identify the video frame of the second video. Alternatively, occurrence of a particular event such as a train entering or leaving a train station, appearance of a loud noise such as an explosion or an abrupt transition in the dynamics of a group of people, e.g. from essentially standing still to running, may be used as the context for identifying the video frame in the second video. The context analysis may be carried out beforehand by batch processing a plurality of videos, possibly including the first video, wherein the videos may be stored in a database. As part of the batch processing, the plurality of videos may be analyzed for a particular context and/or for a group of predefined contexts. If a particular context or any of the group of predefined contexts is detected in one of the plurality of videos, the video may be associated automatically with a corresponding data tag. The context tag may be stored together with the corresponding video in a database, for instance on a police server. The context processing as well as the below described extraction of biometric information from a video may be performed automatically when the video is retrieved, for instance from the Internet or a particular database. The resulting biometric information and/or context information may be stored together with the video, e. g. in the form of associated data in a database, data tags and/or metadata. A data tag may include a unique reference to the video, a reference to one or more video frames, e.g. in the form of a relative timestamp, and the corresponding information or a reference thereto. The information can be in a general form, such as "sharp noise", or in a highly specific form, such as "person X identified in video frame". The latter may also reference biometric information available for that person and stored in a database.

When the user input for selecting the second camera is received, and a context was selected or set by the user, the method automatically searches for a corresponding context, e.g. context tag, in the second video or associated with the second video, and identifies the video frame of the second video based on an identified context tag. As is apparent from the above said, processing of a video to identify a specific context may be based on an analysis of static image data, i.e. a particular video frame, on an analysis of dynamic image data, i.e. a sequence of video frames, and/or on an analysis of associated audio data of the video. Any of the known processing methods, for instance pattern and/or face recognition techniques, may be applied by the computing system to automatically analyze the videos to identify one or several contexts.

The contexts underlying the batch processing of a plurality of videos may in particular be based on information stored in a database wherein the information may comprise biometric data, such as facial data, object data, such as particular items, for instance guns, event data, such as explosions or movements, and the like. The context database may be continuously updated and expanded by the users and may also be provided in a distributed form, in particular involving networked police servers.

According to the present embodiment, the display device is automatically controlled by the computer to display the second video starting from the identified video frame. It is understood that the identified video frame may be an intermediate video frame of the second video. In this case, a user may play the second video backwards from the identified video frame to also view video material preceding the identified video frame. Standard controls, such as knobs or buttons of the system may be used by the user to move forward and backward through the second video at a chosen speed.

By displaying the second video starting from the identified video frame, the method and system enable an investigator to quickly grasp the relationship between the first and second video such that additional information, for instance with respect to the movements of a suspect, can be easily gathered by the investigator.

According to a particular embodiment, controlling the display device to display the second video may comprise switching to the second video. Alternatively, the second video may be displayed on a separate, additional display device or side-by-side with the first video on the same display device. In the latter case, the above mentioned controls may be used to synchronously move through both videos.

According to an embodiment, detecting the at least one camera may comprise performing pattern recognition on the video data of the first video to detect at least one camera object in the video data; and optionally controlling the display device to highlight the at least one camera object, in particular by superimposing a symbol or frame on the displayed first video.

Any of the pattern recognition techniques known in the art may be used to detect the at least one camera object in the video data of the first video. A database storing image data of known image capturing devices such as handheld cameras and/or cell phones of standard manufacturers may be used by the computer or system implementing the described computer-implemented method to automatically detect at least one camera object in the video data of the first video. In particular all of the video frames of the first video may be automatically analyzed to detect all visible camera objects. As part of the detection, the camera objects may be traced through several video frames and in particular associated with persons present in the video and/or other objects such as vehicles or buildings that may be automatically detected using corresponding face and/or pattern recognition techniques. The automatic detection may be performed using neural networks. In the ideal case, the method and system according to the present disclosure is able to automatically identify all cameras present in the first video that may or may not have recorded additional video material at the time of the first video. This explicitly includes installed surveillance cameras, dash cameras and other cameras installed in vehicles and mobile cameras, helmet cameras and body cameras carried by random people.

As will be described in further detail below, the computer-implemented method may comprise determining for each of the camera objects visible in the first video whether a video recorded by the corresponding camera is available. To this end, a plurality of videos retrieved from one or several storage devices, e.g. police servers, and/or from the Internet may be analyzed to determine whether they were recorded with the camera corresponding to the detected camera object. Videos may also be actively retrieved from the Internet, in particular from social media, by the user to be included in the plurality of videos. If such a video is determined, it can be automatically associated with the camera object. Detecting the at least one camera then includes this association such that the camera corresponding to the detected camera object is part of the group of the at least one camera. If no such video is determined, the detected camera object may still be highlighted in the first video to attract the attention of the investigator. In addition, as will also be described below, a person associated with the camera object may automatically be identified by the system. The investigator or the police may then address the identified person to find out whether a relevant video was recorded with the camera corresponding to the detected camera object. The person may for instance be a police officer wearing a body camera.

Relevant videos may, however, have been recorded with cameras that do not correspond to camera objects detected in the first video. This may, for instance, be the case when the corresponding camera was hidden from view of the first camera, e.g. because a person or an object blocked the view or the camera was located outside the viewing range, i.e. field of view, of the first camera. In addition, even cameras at a location separate from the location of the first camera that recorded videos at the same time or a different time than the first video may have recorded relevant supplementary video material. By way of example, the first video may show a suspect descending from a train before committing a crime. The same suspect may be seen a further video boarding the train at a different station. Furthermore, an event such as an explosion or a panic may have been captured by the first camera. The same event may have been captured by other cameras, even far away and not visible to the first camera, for instance by cameras surveilling entrances to a stadium or major building complex. Video material of such cameras may show relevant information. A final example may be a privately recorded video of a time period before, during and/or after a crime that was taken by a person present in the first video, independent of whether the corresponding camera is visible in the first video or not. The present invention automatically identifies such videos and detects the corresponding cameras, for instance by determining the locations where the videos were recorded. The detected at least one camera may therefore comprise one or more cameras visible in the first video, one or more cameras present near the first camera at the time of the first video but not visible in the first video, as well as one or more cameras far away from the first camera but related to the first video through context information such as a particular person or item visible in both videos or a particular event occurring in both videos. The present invention identifies the corresponding videos, "detects" the cameras that recorded these videos and presents the investigator with an option to select the detected cameras, for instance by indicating the location of the detected cameras on a map and/or superimposed on the first video.

According to the present embodiment, the pattern recognition processing identifies and in particular tags camera objects in the video data of the first video. These detected camera objects may then be highlighted when displaying the first video by appropriately controlling the display device. In particular, a processor of the system may control the display device to superimpose a symbol, such as an abstract camera symbol, or a frame on the displayed first video. This helps the investigator to quickly identify potential supplementary video material when viewing the first video. In particular, only those camera objects for which additional video material is available may be highlighted. By clicking on the symbol or the area of the frame via a user input, the investigator may select the corresponding camera object.

According to a further embodiment, detecting the at least one camera may comprise performing person identification, in particular face recognition, on video data of the first video to identify at least one person in the first video. The person identification may in particular be performed using a database storing biometric information of a plurality of individuals.

The person identification may in particular be directed at two different groups of people.

First, the first video may be processed to identify a known suspect, for instance based on biometric information retrieved from a suspect database. Here, the biometric information is not limited to facial data used for face recognition but may alternatively or additionally comprise personal features such as a particular tattoo. The person identification may also be based on particular items, even clothes, carried or worn by the person.

In this case and as will be described in more detail below, a plurality of further videos, retrieved from one or several storage devices and/or from the Internet, may be automatically subjected to person identification processing, in particular face recognition processing, to identify the suspect in one or more of the further videos. Based on the below described determination of a vantage point of the one or more of the further videos with respect to a vantage point of the first video, a spatial relationship of the one or more of the further videos with respect to the location of the first video may be established and indicated on the display device as described in further detail below.

Secondly, the first video may be processed to identify a creator or potential contributor of a further video. In other words, a person associated with a video available to the investigator, for instance uploaded or stored on a police database, or a video that may explicitly be requested by the investigator from the creator shall be identified. This may be done based on additional data, in particular biometric information, associated with the contributor or creator of the further video. Such additional data may have been provided by the contributor or creator of the further video as part of the process of making the video available, for instance by uploading it to a police server. By way of example, some of the above mentioned apps allow creation of a user profile, in particular including a portrait picture of the user, that allows identification of the creator of the uploaded videos. Also, based on uploads in the past and/or a general database, for instance a citizen registration database, biometric information may be used when performing the person identification on the video data of the first video.

In a limiting case, processing of the first video may lead to the identification of all the persons visible in the first video. The result of this identification may be compared with biometric information, in particular facial data of a creator, associated with additional videos, for instance stored in a database, to identify potentially interesting additional videos from a large number of recorded videos in a database.

In combination with the above described identification of a contributor, it may be automatically determined whether the at least one identified person is associated with the at least one camera object, in particular by determining whether the at least one camera object is carried by the at least one identified person and/or by determining whether the at least one camera object is associated with a vehicle registered to and/or operated by the at least one identified person. This determination may for instance be made based on a specific spatial relationship between the identified person and the camera object and/or the vehicle in at least one video frame, in particular in a sequence of video frames. The first video may be processed to automatically detect a license plate of a vehicle. Based on the detected license plate, and based on registration data received from a suitable registration database, the method may automatically determine whom the vehicle is registered to.

As a result of the above described determination, an association is established between the at least one identified person and the at least one detected camera object. This association may then be used to retrieve complementary video material associated with the detected camera object.

According to one embodiment, the computer-implemented method may further comprise analyzing a plurality of videos to extract biometric information and/or context information based on metadata and/or video data of the plurality of videos, optionally in combination with environment information, in particular three-dimensional map information; and determining at least one video of the plurality of videos associated with the first video based on the extracted biometric information and/or context information.

The analysis may in particular be performed by automatically batch processing a plurality of videos stored on one or several storage devices and/or retrieved from such storage devices and/or the Internet by a processing system. As the batch processing may be performed independently and in preparation of the above described analysis of the first video, the processing system may be physically separated from the system that implements the control of the display device.

Furthermore, the first video may be processed together with the plurality of videos in the mentioned batch processing. The extracted biometric information and/or context information resulting from the processing of the plurality of videos may be stored as additional information, for instance in the form of tags associated with a corresponding video, in particular with one or several specific video frames of the corresponding video. The additional information may be stored together with the corresponding video, for instance in a video database, and/or in a separate database. In the latter case, the additional information is stored together with a unique identification of the corresponding video, in particular a location such as a URL identifier indicating how to retrieve the corresponding video.

According to this embodiment, biometric information and/or context information is extracted based on metadata and/or video data of the plurality of videos. The term video data here and in the following refers to the actual image data, possibly in combination with corresponding audio data, of a video. In contrast hereto, the term metadata refers to any additional data that is not image data or audio data but directly associated with the video. Consequently, metadata according to the present disclosure includes meta information included in the file storing the video as well as additional meta information stored separately from the video file. The meta information may be included in the video file according to any of the known metadata formats, including EXIF, GPS, IPTC, XMP, QuickTime Tags, MWG Tags, and the like. The meta information stored separately from the file may in particular include biometric information on the creator or contributor of a video, for instance uploaded together with the video to a police server, as well as context information, such as time information or spatial information, provided together with the video and/or resulting from a previous processing of the video by a processing system.

Biometric information here and in the following refers to information that allows for an identification of a person from video data. The biometric information may therefore in particular include facial data that may be used in face recognition processing as known in the art. Additionally or alternatively, the biometric information may include bodily features such as height, weight, race, skin tone, hair color, tattoos, piercings, or the like that allow identifying a specific person with a certain probability from video data. In addition, the biometric information may also include voice-specific information that allows identifying a specific person from audio data of a video. To identify a particular person in different videos, also short-time characteristics such as clothes, shoes, caps, hats or other wearable items may be used as temporary biometric information.

The context information here and in the following relates to any information associated with the context of a video. Particular examples will be described in detail below with respect to a temporal context, a spatial context, and the occurrence of a particular event. The present disclosure is however not limited to these specific contexts but may be applied to any context that allows to establish a connection between two videos.

The biometric information and/or context information, in particular with respect to a spatial context, may be extracted in combination with environment information that may be separately provided, for instance retrieved from the Internet or a separate database. Such environment information may in particular include map information, for instance three-dimensional map information, with respect to actual or probable surroundings of the camera at the time of recording of the corresponding video. The map information may include detailed information on a city layout, for instance a grid of streets, two- and/or three-dimensional information on city structures such as buildings, installations, street crossings, bridges and the like, information on points of interest as well as recorded image data such as aerial views or street views. This map information may be used by the processing system to identify a specific environment such as a particular street crossing, a building, a city structure or a square in the image data of the video frames of a particular video. From a comparison of the map information with the image data, a location of the camera recording the image data and optionally an orientation of the camera may be automatically determined. The present disclosure uses standard image processing techniques, in particular pattern recognition, to identify objects in the image data that may be compared and identified with objects in the map information. As a result, spatial information with respect to the camera recording the corresponding video may be extracted as context information on the corresponding video.

According to the present embodiment, at least one video of the plurality of videos is determined as being associated with the first video based on the extracted biometric information and/or context information. The association between the at least one video and the first video establishes a relationship with respect to the extracted biometric information and/or context information. In other words, the processing system automatically determines whether the first video and the at least one video are connected in terms of at least one specific biometric information and/or context information. Particular examples will be described in more detail below. It is, however, understood that the present disclosure is not limited to these examples.

According to a particular embodiment, the biometric information may comprise biometric information, in particular facial data, of a creator of a corresponding video, wherein determining the at least one video comprises determining whether the biometric information of the video conforms with the at least one identified person. In other words, it may be determined whether a person identified from video data of the first video as described above is a creator of at least one of the plurality of videos. The determination may be made by the processing system by comparing biometric information extracted from the plurality of videos with biometric information associated with the identified person. As the identification of the person from video data of the first video may be made on the basis of biometric information previously collected and potentially stored in a database, such biometric information is automatically associated with the identified person and may therefore easily be compared with the extracted biometric information. It shall also be emphasized that the previously collected biometric information that may be used for the above described person identification process may already comprise the biometric information extracted from the plurality of videos, in particular if such biometric information is extracted by preceding batch processing. Consequently, the determination of the at least one video by determining whether the biometric information of the video conforms with the at least one identified person may be performed as part of the analysis of the first video to automatically detect at least one camera.

According to this embodiment, a video out of a plurality of available videos may be automatically associated with a person identified in the first video and therefore present in the first video. If as described above the identified person is additionally associated with a detected camera object, the camera object may be automatically highlighted in the displayed first video such that it may be selected by an investigator, for instance by clicking on it. The method will then automatically control the display device to display the video associated with the identified person. Even if the identified person is not determined to be associated with a detected camera object, the video associated with the identified person may still be selected by the investigator as described below.

The context information may comprise time information, in particular a time range, of a corresponding video, wherein determining the at least one video comprises establishing a temporal relationship between the time information of the video and time information, in particular a time range, of the first video and determining whether the temporal relationship fulfills a first condition.

The context information may therefore relate to a specific temporal relationship between the at least one video and the first video. The specific temporal relationship may in particular be an overlap of the recorded time ranges of the at least one video and the first video. Such an overlap may be set as the first condition. In this case, the above-mentioned video frame of the second video starting, from which display of the second video is initiated in response to the user input, may be identified in the overlapping time range. A selectable indicator, for instance the highlighted camera object, may be displayed in the first video only for the overlapping time range. The specific temporal relationship is, however, not limited to an overlap of the time ranges but may also be given by recording times of the at least one video and the first video falling into a specific period of time, which may be defined based on a known or suspected occurrence of a crime. The specific period of time may in particular be set by manual input of the investigator. By way of example, the period of time may include one or several hours around the occurrence of a crime, the entire day of the occurrence of the crime or even multiple days before and after the crime. This allows the processing system to automatically identify and associate videos from the plurality of videos with a recording time inside a relevant interval around the crime under investigation.

Fulfillment of the first condition may be required in addition to the above described conformity of the biometric information. In particular, an overlapping time range may be checked for a video associated with an identified person before highlighting the detected camera object and/or the identified person in the video. Even if the camera that was used by the identified person to record the corresponding video is hidden, the method allows indicating supplementary video material by highlighting the identified person. By clicking on the highlighted person, the user may initiate display of the associated corresponding video as the second video.

The time information may be extracted from the above mentioned metadata of the videos. The metadata may for instance comprise time and date of creation of the video. In addition, video capturing equipment generally records the relative time of the video frames with respect to the first video frame of a video. The time information may also be provided as separate data, for instance as information provided on upload of the video. The method according to the present embodiment automatically extracts the time information from available metadata to establish a temporal relationship between the time information of the corresponding video and time information of the first video. As mentioned above, the context information, i.e. extracted time information, may be stored as additional information with respect to the processed videos in a database.

Additionally or alternatively the context information may comprise spatial information, in particular a vantage point, of a corresponding video, wherein determining the at least one video comprises establishing a spatial relationship between the spatial information of the video and spatial information, in particular a vantage point, of the first video and determining whether this spatial relationship fulfills a second condition. The second condition may for instance be predetermined or set by a user or investigator before processing the first video.

A vantage point of a video refers to the location at which the camera recording the video was located and may additionally include an orientation of the camera, in particular in the form of three-dimensional rotation angles of the lens axis of the camera. As the orientation and/or the location of the camera may change during the recording of a video, the vantage point may also refer to a time series of vantage points. Unless otherwise mentioned, the present disclosure also applies to comparing each element of a time series of vantage points with one or several corresponding elements of a time series of vantage points of the first camera to establish a, potentially time dependent, spatial relationship between the spatial information of the video and the spatial information of the first video. Alternatively, one representative vantage point, for instance at the beginning of the video, may be used to establish the spatial relationship.

The spatial information, in particular the location and/or orientation of the camera, may be extracted from metadata of the corresponding video, such as GPS latitude, longitude and altitude tags, roll, yaw and pitch angles or the like. Such metadata may for instance be recorded when the location services of a camera-equipped mobile phone are turned on at the time of recording of the video. Even if the mobile phone does not possess a dedicated GPS sensor or such a sensor is not activated, localization data of the mobile phone in the telecommunications grid, e.g. with respect to a femtocell serving base station, may be used to establish a location of the video and include it in the metadata. If such metadata is not available, the method according to the present disclosure may automatically process the video data of the corresponding video to establish a location and potentially orientation of the recording camera. This processing may in particular involve the above-mentioned environment information, such as three-dimensional map information, to determine the location of the camera. As the present disclosure is particularly directed at urban areas, locations and orientations of cameras that recorded the plurality of videos may be derived from the video data itself with a certain range of precision. By way of example, specific landmarks, such as buildings, squares or crossings, may be detected in the video using the environment information and a location and possibly orientation may be determined based on a comparison of the detected image objects with three-dimensional map information. Alternatively or additionally, a relative location and/or orientation of the corresponding cameras may be determined based on a change of perspective between the first and the other video with respect to specific immobile objects, such as landmarks. Consequently, a reference video, for instance the first video, with a known location and/or orientation of the corresponding camera may be used to determine the relative and/or absolute location and/or orientation of another video.

Independent of whether the spatial information is extracted from the metadata or the video data of the video, a vantage point of the video—or a series of vantage points—are determined that may be compared with a similarly established vantage point of the first video. The present disclosure further includes a simpler, and therefore faster, processing of the plurality of videos to establish a spatial relationship by trying to detect and associate landmarks such as particular buildings or city structures in both the first video and the plurality of videos. If a unique landmark can be identified in both videos, a proximity of the two cameras can be established such that the second condition is fulfilled. If a more precise vantage point can be established from the metadata or the video data for both the first video and the plurality of videos, a distance between the two respective cameras may be automatically calculated and compared with a maximum distance as the second condition. Alternatively, a particular area of a city such as a square, a neighborhood or a train or subway line, may be used to set the second condition with respect to the first camera. By way of example, if the first camera and the camera for the at least one video are located along the same train line, the second condition for the spatial relationship between the two videos may be determined to be fulfilled. The second condition or multiple alternative second conditions may be predetermined or set by the user before processing the first video and/or the plurality of videos.

Fulfillment of the second condition, i.e. a particular spatial relationship between the first video and the at least one video, may be used as an alternative for the above described conformity of the biometric information, for instance if the at least one video cannot be associated with an identified person. By way of example, the at least one video may have been recorded by a fixedly installed camera in the vicinity of the first camera. The location and possibly the orientation of such a camera may be known and stored together with the recorded video and/or in a separate database. In addition to the second condition, fulfillment of the first condition, i.e. a temporal relationship, may be required to associate the at least one video with the first video. Again, overlap of the time ranges of the videos may be required. However, the combination of the conformity of the biometric information and the fulfillment of the second condition may alternatively be used to localize relevant videos from an identified person that were recorded at different locations. As described in more detail below, the extracted content information in terms of a location of the corresponding camera may be used to display an indicator for the corresponding camera, for instance on a map of the surroundings.

According to a further embodiment, the context information may comprise event information, wherein the event information indicates an occurrence of a particular event in a corresponding video, and wherein determining the at least one video comprises determining whether the particular event occurs in both, the at least one video and the first video. As mentioned above, the particular event may be any event that can generally be detected in video data, and optionally including audio data. Particular examples may for instance be given by an explosion that may be detected both in the video data and in the audio data. Also, arrival or departure of a particular vehicle such as a train or a car may be used to define an event. Even the presence of a particular item such as a particular suitcase or a gun may be used to define an event. The event may be detected from a single video frame or from a sequence of video frames of the corresponding videos. Consequently, the event may also relate to dynamic changes in a video, for instance the onset of a panic or a particular person starting to run. Here, extraction of context information may also use extracted biometric information, in particular with respect to an identified person, e.g. a suspect.

One or several events may be predefined and/or selected by a user from a list of possible events before processing the first video and the plurality of videos. Also, the event itself may be extracted from the first video and then be used to process the plurality of videos. While selection or definition of a particular event generally still involves interaction with the investigator, processing the plurality of videos to establish an event-based association between at least one video of the plurality of videos and the first video can be performed automatically by a processing system. Such processing may in particular be performed beforehand as batch processing wherein the videos may be tagged with corresponding event tags. Such an event tag may for instance indicate that an explosion is detected to occur in a particular video at a particular time. The described method may then simply compare the event tags with the one or several events extracted from the first video to establish an association.

Again, event-based comparison of context information may be combined with one of more of the above described conditions. Fulfillment of the first condition, i.e. a temporal relationship, may be used to better correlate detected events such as an explosion. Fulfillment of the second condition, i.e. a spatial relationship, may be used to preselect videos for event-based context processing or to better correlate detected events. The method may for instance allow automatically tracking a particular item such as a suitcase or a vehicle inside a particular area, for instance a neighborhood, by combining event information with respect to the item and spatial information with respect to the neighborhood. Determined spatial information of a video that is associated with the first video based on event information may be used to display an indicator for the corresponding camera in a map.

Automatically detecting the at least one camera may further comprise associating an identified person and/or a camera object in the first video with a camera of the at least one camera based on the extracted biometric information and/or context information. This means that the video, from which the biometric information and/or context information is extracted, was recorded by an identified person and/or using a camera object in the first video. As mentioned above, in particular time information and/or spatial information may be used to establish such an association with the identified person and/or the camera object in the first video. The identified person and/or the camera object may then be highlighted as a selectable area of the first video when displaying the first video. The second video may then be selected by selecting one of the highlighted areas.

The at least one camera that is automatically detected thus comprises those cameras, whether visible or not visible in the first video, that were taken with one of the detected cameras and/or by one of the identified persons at the time of the first video. These cameras where therefore inside the viewing range of the first video.

The at least one camera may, however, additionally or alternatively comprise cameras associated with one of the identified persons wherein the camera at the time of taking the corresponding video was located outside the viewing range of the first video. In this case, spatial information on the additional video may be used as representative of the location of the corresponding camera such that the corresponding camera is included in the group of "detected" cameras. It shall be emphasized that detecting the at least one camera is not limited to detection of a camera object in the video data of the first video but extends to the virtual detection of a camera that recorded an associated video based on the above described biometric information and/or context information. Consequently, one or several of the at least one camera may be associated with an identified person even though the corresponding video was recorded outside the viewing range of the first camera.

Finally, the at least one camera may additionally or alternatively comprise cameras that are neither associated with an identified person nor a detected camera object but that recorded at least one video out of the plurality of videos that is associated with the first video through context information, e.g. a combination of a specific temporal relationship and a specific spatial relationship.

For cameras that recorded associated videos located outside the viewing range of the first video, extracted spatial information may be used to establish a location of the corresponding cameras.

More specifically, automatically detecting the at least one camera may further comprise for each video of the at least one video: determining whether a vantage point of the video is located outside a viewing range of the first camera; and upon determination that the vantage point of the video is located outside the viewing range, associating the vantage point with a camera of the at least one camera and controlling the display device to display an indicator, in particular superimposing the indicator on the first video, wherein the indicator indicates a relative location of the camera with respect to the first camera. The vantage point of the video may be extracted as spatial information as described above by automatic processing of the corresponding video. Based on the extracted spatial information it may be determined whether the vantage point is located outside the viewing range of the first camera. The viewing range of the first camera may for instance be determined based on a known location and technical specifications of the first camera and/or from the video data of the first video.

If the vantage point of the video is located outside the viewing range of the first camera, for instance because the video was taken at a different time by one of the identified persons or is associated with the first video through a particular spatial information, time information and/or context information, the vantage point is automatically associated with a camera of the at least one camera. In other words, the camera is virtually detected based on the association of the corresponding video and the first video.

Based on a known vantage point of the first video, the display device according to this embodiment is controlled to display an indicator, for instance by superimposing the indicator on the first video. The indicator may indicate the relative location of the camera with respect to the first camera, for instance in the form of an arrow pointing in the direction of the camera. The arrow may be controlled as a selectable object wherein selection of the arrow through a user input may initiate displaying the corresponding video as the second video.

In a particular embodiment, displaying the indicator may comprise displaying a two- or three-dimensional map with superimposed symbols indicating locations of at least the first camera and the camera. Such a map may be displayed separately from the first video or as a picture-in-picture on the first video. The superimposed symbols may represent selectable regions of the map such that clicking on such a symbol may start display of the corresponding video as the second video. As described above, the map may be retrieved and/or calculated based on available map information such as a map database. The map may be oriented and scaled such that the locations of the first camera and at least one further camera out of the at least one detected camera are indicated in the map. In a specific embodiment, all locations of the first camera and the at least one detected camera are indicated in the map. If the absolute or relative orientations of the first camera and the at least one detected camera are known, these orientations may also be indicated in the map, for instance in the form of a line, ray or cone representing the lens axis or viewing range of the corresponding camera.

Indicating the locations and optionally orientations of the first and the at least one detected camera in the map allows an investigator to quickly and conveniently switch between related videos. The spatial relationship indicated in the map also simplifies analysis of a particular event and/or the movements of a particular person.

As associated videos are automatically detected in a plurality of videos previously collected and stored in a database, an investigator can simply start with an initial video, for instance recorded by a surveillance camera, as the first video. Based on the content of the first video, the investigator may select one or several events from a list and/or a database to further categorize the context under investigation. Also, the investigator may set spatial limits, such as a maximum distance, and/or a specific time period for filtering associated videos. The described computer-implemented method significantly facilitates the originally manual work of an investigator and helps to provide better investigation results. Also, the described processing based on biometric information and/or context information reduces the amount of unnecessarily processed or displayed videos and therefore, optimizes the use of computer resources. The described processing is also suited to handle a large volume of contributed videos, both from surveillance cameras and private cameras, as it may be performed beforehand as batch processing.

Furthermore, it is provided a computer program product, comprising one or more computer readable media having computer-executable instructions for performing the steps of the computer-implemented method according to one of the above described embodiments.

Further features and exemplary embodiments as well as advantages of the present disclosure will be explained in detail with respect to the drawings. It is understood that the present disclosure should not be construed as being limited by the description of the following embodiments. It should furthermore be understood that some or all of the features described in the following may also be combined in alternative ways.

In the figures, identical reference signs indicate identical or similar components.

Figure 1:
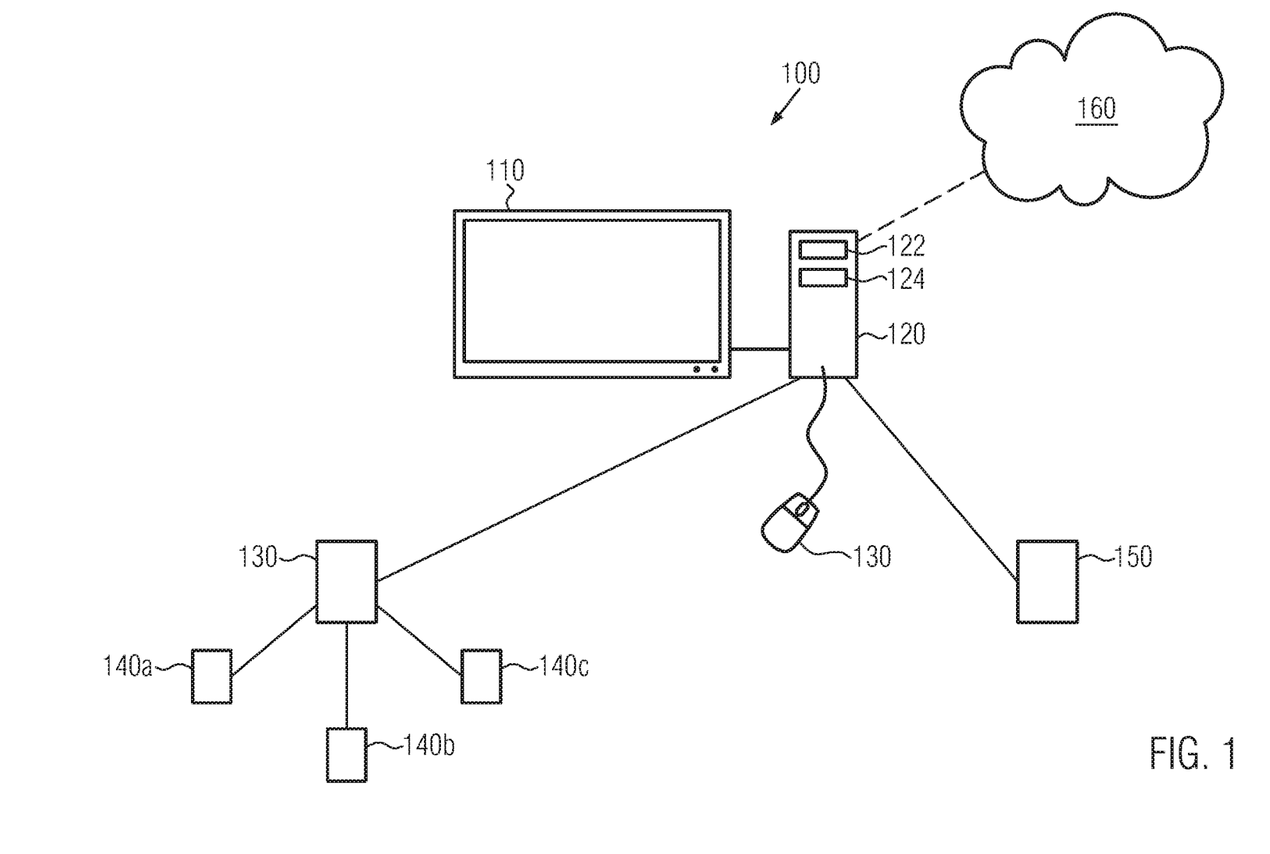
FIG. 1 shows a distributed processing system implementing the method according to the present invention.

An exemplary distributed processing system implementing the methods according to the present disclosure is shown in FIG. 1. A local computer system 100 is connected to a server 130 at a remote location and a storage device 150 that may also be provided at a remote location. In addition, the figure shows a connection, wirelessly or via cable, to the Internet 160. The server 130 itself is connected to various storage devices 140a-c that may each store videos for processing according to the present invention.

The local computer system 100 in this illustrative example, that may for instance be provided at a police station, comprises a display device 110 connected to a computer 120 that is itself connected to an input device 130. The computer 120 further comprises a processor 122 and a storage device 124, such as an optical storage device or flash memory.

The computer system 100 retrieves videos from the storage device 150, the server 130 and the Internet 160 and processes them using the processor 122 according to the above described methods. Some or all of the processing may, however, be performed by the server 130 and/or a SaaS provider connected to the Internet 160. As described above, the computer 120 comprises corresponding control devices to control the display device 110 to display the first and/or second videos.

The present disclosure is, however, not limited to the particular arrangement of processing components shown in FIG. 1 but may comprise additional or different components as needed. By way of example, a gateway, a router, further local and/or remote storage devices, additional input devices and/or display devices, and the like may be provided as needed.

Figure 2:
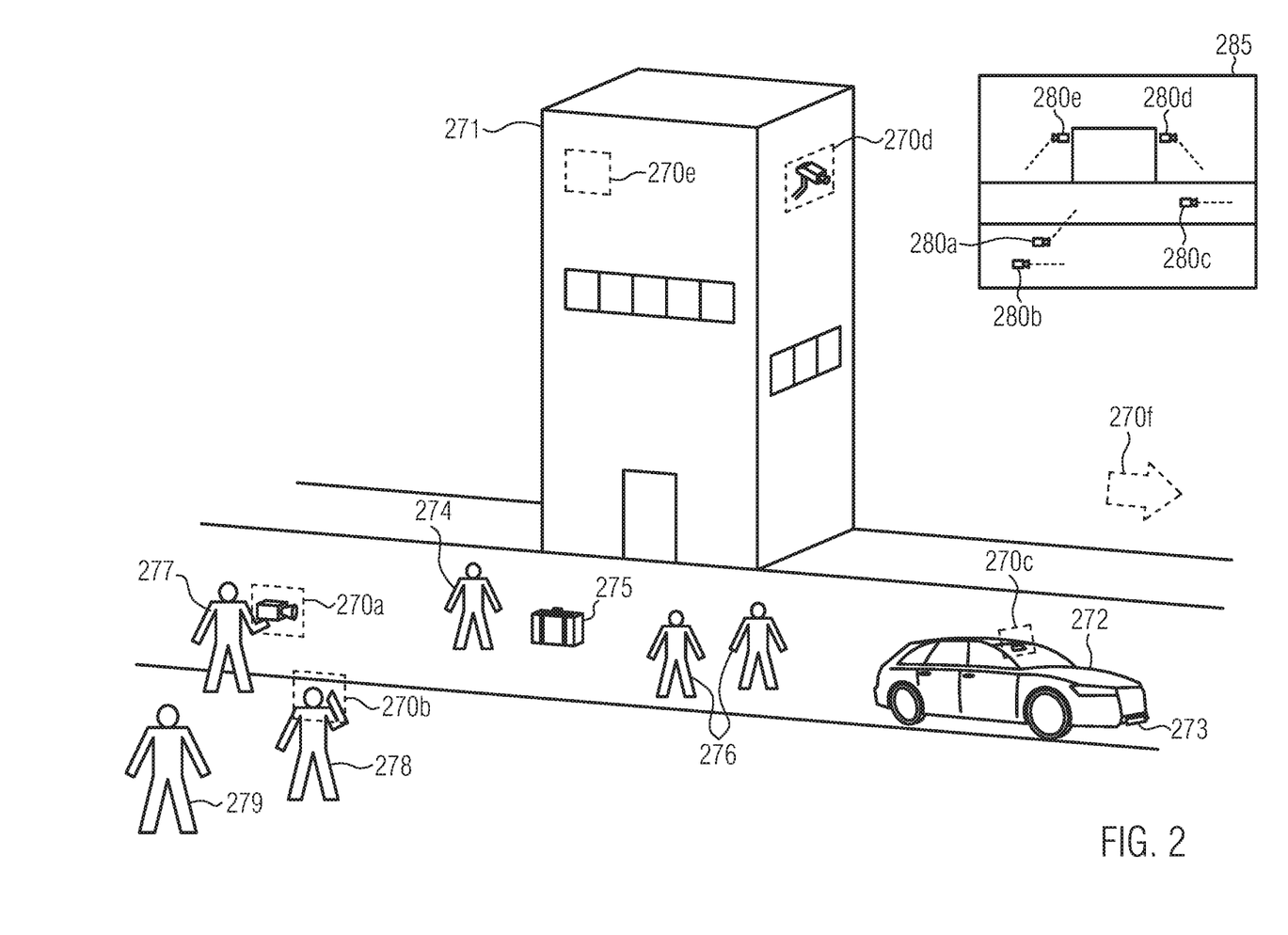
FIG. 2 shows an exemplary video frame of the first video with superimposed indicators according to the present invention.

FIG. 2 shows an exemplary video frame of the first video with superimposed indicators as may be displayed by the display device 110. It is understood that the depicted scenery is chosen for illustrative purposes only and not intended to limit the present disclosure in any way.

The illustrative video frame of the first video shows a representative building 271 that may be compared with environment information available from a database, for instance comprising three-dimensional map information. The particular orientation of the building 271 in the video frame may be used by the processing system to determine the location and optionally orientation of the first camera recording the corresponding video frame. To better illustrate the orientation of the building, representative arrays of windows are shown on the different sides of the building. The illustrative scenery also includes a street in front of the building with an adjacent sidewalk. Location and orientation of the street may be known from the database storing the three-dimensional map information.

A number of persons 274 and 276 to 279 can be seen in the displayed video frame. Among these persons, person 274 may be automatically detected as a suspect by comparison with a suspect database. Next to the suspect 274, a specific object, here a suitcase 275, is shown. The suitcase 275 may be automatically detected by the processing system, wherein the processing system may establish a spatial relationship between the suspect 274 and the object 275. Both the suspect 274 and the suitcase 275 may for instance be used to establish a context as described above to identify related videos from the plurality of videos retrieved from a database and/or the Internet.

The further persons 276 to 279 that are visible in the video frame of the first video may be automatically identified using biometric information as described above. In the present non-limiting example, the processing system has identified the persons 277, 278 and 279 while no identification of the persons 276 was possible. In the illustrative example, the persons were identified based on biometric information provided in combination with videos that were uploaded by these persons to a police server or the Internet, for instance using social media.

With respect to person 277 and person 278, the processing system extracted context information in terms of spatial and time information and associated the corresponding videos with the first video. In other words, the automatic processing identified videos out of a plurality of retrieved videos that were recorded by the persons 277 and 278 present in the video frame of the first video using cameras 270a and 270b at or around the time of the first video. In the case of person 279, a related video was automatically identified using the biometric information of the person and further context information. By way of example, the related video was recorded by person 279 at a different location but is related to the first video because the suspect 274 was also identified in the related video.

Among cameras 270a and 270b, only camera 270a is visible in the illustrative video frame of FIG. 2. Camera 270b is hidden from view of the first camera by the head of person 278. The automatic processing of the video data has detected three cameras in the video frame based on pattern recognition. Camera 270a is carried by person 277 and can be automatically associated with this person based on a spatial relationship. Camera 270d is a fixedly installed surveillance camera, installed on a wall of the building 271. Camera 270c is a dash camera of vehicle 272. The automatic processing detects the corresponding camera objects in the video frame wherein the computer controls the display device to superimpose dashed frames on the video frame to highlight the detected camera objects. By clicking on the area of the dashed frames, a user can select the corresponding associated video for display on the display device.

Vehicle 272 is also automatically detected using pattern recognition wherein the processing system has further detected a license plate 273 and extracted a vehicle registration number that can be compared with a registration database to determine the keeper of the vehicle. The system has further determined a video associated with the keeper of the vehicle from a plurality of available videos wherein time and/or spatial information was used to associate the video with the detected camera 270c. As a result of the association with the detected camera 270c, the display device is controlled to highlight the detected camera by superimposing a dashed frame on the video frame.

Although camera 270*b* is not visible in the video frame, and consequently cannot be detected from the video data, the automatic processing using the above described methods has automatically associated a video, that was for instance uploaded by the person 278, with the identified person 278 in the video frame. To indicate to the user that supplementary video material is available, the system controls the display device to superimpose a dashed frame on the video frame at the determined location of camera 270*b*. By clicking on the corresponding area, the user may thus select display of the corresponding video.

Likewise, a further surveillance camera 270*e* is installed on a wall of the building 271 that is hidden in the perspective of the first video. The corresponding video has, however, been either retrieved from the surveillance system or been made available through uploads to a police server. By batch processing a plurality of videos including the corresponding surveillance video, the processing system has associated the surveillance video with the first video, for instance based on a specific temporal relationship with the first video. As the location and orientation of the surveillance camera 270*e* are known, the system controls the display device to superimpose a dashed frame at the location of the corresponding surveillance camera on the video frame of the first video. By clicking on the dashed frame, the user may thus select display of the corresponding surveillance video.

Finally, the identified person 279 has been determined by the processing system to be the creator of a related video as described above, for instance based on automatic detection of the suspect 274 in the corresponding video data. Based on metadata recorded together with the related video, the system extracted spatial information that allows indicating a relative location of the camera that recorded the related video with respect to the location of the first camera. In the present example, this indication is superimposed on the video frame of the first video in the form of an arrow 270*f*. By clicking on the arrow 270*f*, the user can bring up the corresponding video. Consequently, the preparatory batch processing of the plurality of videos leading to associations between one or several of these videos and the first video may help an investigator track the movements of a suspect 274.

The illustrative example of FIG. 2 further shows a picture-in-picture 285 indicating the relative locations and orientations of the detected cameras, both visible and not visible in the video frame, with respect to the first camera (not shown) that recorded the first video. In the schematic example, a two-dimensional map is shown wherein the detected cameras 280*a*-*e* are indicated as symbols. In addition, a dashed line indicates the orientation of the corresponding camera. The map-type indicator 285 makes it easy to maneuver through available supplementary video material and provides information on the relative perspective of the video material that facilitates the work of an investigator. In addition to the dashed frames, the displayed camera symbols in the indicator 285 may be configured as selectable items through a corresponding control of the computer such that the investigator may bring up the corresponding videos by simply clicking on the camera symbols.

Figure 3:
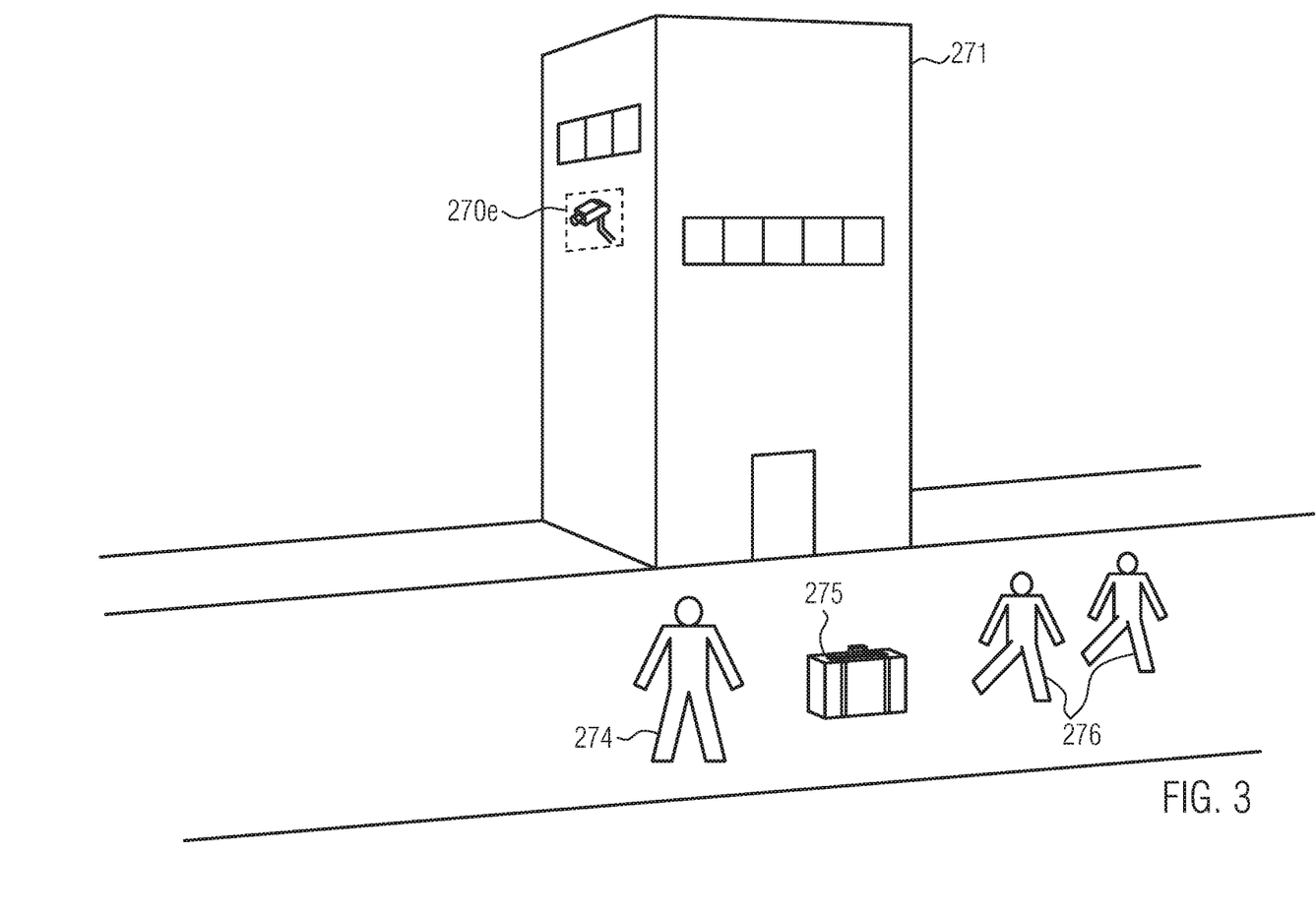
FIG. 3 shows a second video associated with a detected camera in the first video.

FIG. 3 shows a video frame of a second video associated with the first video. In the present example, the second video is associated with the detected camera 270*a* shown in FIG. 2. By clicking on the display area highlighted by the dashed frame, the user instructed the system to display the corresponding video. For illustration purposes, FIG. 3 shows a later video frame of the second video. The processing system may, however, start displaying the second video at a video frame corresponding to the video frame of the first video where the user input was registered.

The video frame of FIG. 3 shows the same building 271, now from a different perspective, namely the perspective of the identified person 277. Due to the change in perspective, previously hidden surveillance camera 270*e* is now visible in the second video. Also, the user gets a closer look at the suspect 274 and the suitcase 275. As compared to the situation in FIG. 2, the unidentified persons 276 in the video frame of FIG. 3 have started running away from the suspect 274, for instance as a result of a threatening action. This transition of the dynamics of one or several persons 276 from a particular time to a later time inside recorded video data may also be used by the automatic processing to establish a context of the video that allows associating an available supplementary video with the first video. Although not shown in FIG. 3, the system may again highlight detected cameras in the video frame of the second video, for instance by superimposing dashed frames on the video frame. The user may then click on the highlighted areas to switch from display of the second video to display of a third video. Also, a picture-in-picture indicator as shown in FIG. 2 may be superimposed.

Although not shown in FIG. 2, the position of the first camera may also be indicated in the picture-in-picture. By clicking on the corresponding camera symbol, the perspective may be switched back to the perspective of the first video.

The described processing of a plurality of videos to establish associations with a first video based on biometric information and/or context information makes it possible to indicate supplementary video material to a user viewing the first video. Via simple and convenient user input, the user may rapidly switch between the different videos and thereby analyze different perspectives of locally, temporally and/or contextually related scenes. The described method and system thus significantly facilitate the work of an investigator and further reduce the processing load of the involved systems.

Figure 4:
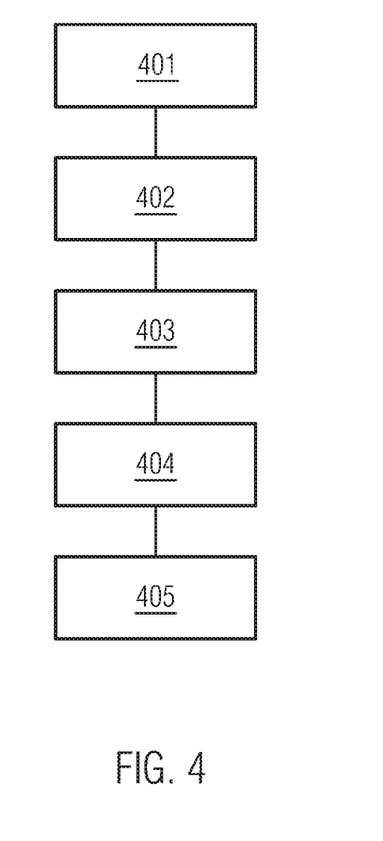
FIG. 4 shows a flowchart of the computer-implemented method according to the present invention.

FIG. 4 finally shows a flowchart of the computer-implemented method according to the present disclosure. In the particular, non-limiting example, the first video is analyzed to automatically detect at least one camera in a pre-processing step 401. This analysis may in particular comprise the extraction of biometric information and/or context information from a plurality of videos stored in a database. As part of the analysis, associations between the plurality of videos and the first video may be established based on the extracted information.

In step 402, a display device is controlled to display the first video wherein the detected at least one camera may be highlighted by superimposing a frame or symbol on the first video. A user input selecting a second camera from among the highlighted detected cameras is received in step 403 using an input device. Based on the video frame of the first video displayed at the time of the user input, and extracted time and/or context information, a video frame of a second video associated with the selected camera is identified in step 404 that corresponds to the displayed video frame of the first video. Finally, the display device is controlled to display the second video starting from the identified video frame in step 405. As described above, the display device may be controlled to switch to the second video or to display the second video side-by-side with the first video.

The described computer-implemented method provides a highly efficient and convenient way of analyzing related videos. As the processing based on biometric information and/or context information may be performed in a batch processing, the determined associations of videos with the first video may be indicated at the time of viewing the first video. This significantly reduces time unnecessarily spent by the user viewing unrelated videos and also reduces the real-time computer load for pattern and/or face recognition. The database storing the plurality of videos may be continuously updated by applying more advanced recognition algorithms in later batch processing steps. Also, neural networks may be continuously trained to increase the recognition rate such that previously extracted biometric and/or context information may be revised, updated and extended in subsequent batch processing runs. Likewise, a continuously expanding database of possible contexts and biometric information may be created using the above described methods.

The invention claimed is:

1. A computer-implemented method for supplementing video material, the method executed by one or more processing devices and comprising:
   controlling a display device to display a first video associated with a first camera and retrieved from a storage device;
   analyzing the first video to detect at least one additional camera, wherein analyzing comprises performing pattern recognition on video data of the first video to detect at least one camera object in the video data; and
   controlling the display device to display a second video associated with a second camera among the detected at least one additional camera in response to a user input.

2. The computer-implemented method of claim 1, wherein controlling the display device to display the second video comprises:
   receiving, as the user input, a selection input for selecting the second camera input by the user by means of an input device;
   identifying a video frame of the second video corresponding to the displayed video frame of the first video; and
   controlling the display device to display the second video starting from the identified video frame.

3. The computer-implemented method of claim 1, wherein controlling the display device to display the second video comprises switching to the second video.

4. The computer-implemented method of claim 1, wherein detecting the at least one additional camera further comprises:
   performing person identification, on video data of the first video to identify at least one person in the first video.

5. The computer-implemented method of claim 1, further comprising:
   wherein detecting the at least one additional camera comprises performing person identification using face recognition on video data of the first video to identify at least one person in the first video; and
   determining whether the at least one identified person is associated with the at least one camera object by at least one selected from the group of (a) by determining whether the at least one camera object is carried by the at least one identified person and (b) by determining whether the at least one camera object is associated with at least one vehicle selected from the group of (i) registered to and (ii) operated by the at least one identified person.

6. The computer-implemented method of claim 1, further comprising:
   analyzing a plurality of videos to extract at least one selected from the group of (a) biometric information and (b) context information based on at least one selected from the group of (i) metadata, (ii) video data of the plurality of videos, and (iii) environment information comprising three-dimensional map information; and
   determining at least one video of the plurality of videos associated with the first video based on the extracted at least one selected from the group of (a) biometric information and (b) context information.

7. The computer-implemented method of claim 6, wherein the biometric information comprises biometric information comprising facial data of a creator of a corresponding video; and
   wherein determining the at least one video comprises determining whether the biometric information of the video conforms with the at least one identified person.

8. The computer-implemented method of claim 6, wherein the context information comprises time information comprising a time range of a corresponding video; and
   wherein determining the at least one video comprises establishing a temporal relationship between the time information of the video and time information comprising a time range of the first video and determining whether the temporal relationship fulfills a first condition.

9. The computer-implemented method of claim 6, wherein the context information comprises spatial information, in particular comprising a vantage point of a corresponding video; and
   wherein determining the at least one video comprises establishing a spatial relationship between the spatial information of the video and spatial information, comprising a vantage point of the first video and determining whether the spatial relationship fulfills a second condition.

10. The computer-implemented method of claim 6, wherein the context information comprises event information, the event information indicating an occurrence of a particular event in a corresponding video; and
    wherein determining the at least one video comprises determining whether the particular event also occurs in the first video.

11. The computer-implemented method of claim 6, wherein detecting the at least one additional camera further comprises associating at least one selected from the group of (1) an identified person and (2) a camera object in the first video with a camera of the at least one additional camera based on the extracted at least one selected from the group of (a) biometric information and (b) context information.

12. The computer-implemented method of claim 6, wherein detecting the at least one additional camera further comprises:
    for each video of the at least one video:
    determining whether a vantage point of the video is located outside a viewing range of the first camera; and
    upon determination that the vantage point of the video is located outside the viewing range, associating the vantage point with an additional camera of the at least one additional camera and controlling the display device to display an indicator and superimposing the indicator on the first video, the indicator indicating a relative location of the additional camera with respect to the first camera.

13. The computer-implemented method of claim 12, wherein displaying the indicator comprises displaying a two- or three-dimensional map with superimposed symbols indicating locations of at least the first camera and the additional camera.

14. A computer program product, comprising one or more non-transitory computer readable media having computer-executable instructions for performing the steps of a computer-implemented method comprising:
- controlling a display device to display a first video associated with a first camera and retrieved from a storage device;
- analyzing the first video to detect at least one additional camera located in an area of interest by performing pattern recognition on video data of the first video to detect at least one camera object in the video data; and
- controlling the display device to display a second video associated with a second camera among the detected at least one additional camera in response to a user input.

15. The computer-implemented method of claim 1, wherein the analyzing step further comprises analyzing the first video to detect at least one additional camera located in an area of interest.

16. The computer-implemented method of claim 2, wherein the receiving step further comprises receiving, as the user input, a selection input for selecting the second camera in a displayed video frame of the first video input by the user by means of an input device.

17. The computer-implemented method of claim 3, further comprising controlling the display device to highlight the at least one camera object.

18. The computer-implemented method of claim 17, wherein the step of controlling the display device to highlight the at least one camera object further comprises controlling the display device to highlight the at least one camera object by superimposing a symbol or frame on the displayed first video.

19. The computer-implemented method of claim 4, wherein the performing step further comprises performing person identification using face recognition on video data of the first video to identify at least one person in the first video.

* * * * *